Patented Sept. 5, 1933

1,925,602

UNITED STATES PATENT OFFICE 1,925,602

STABILIZED SOLVENT

Arthur Loring Pitman, Niagara Falls, N. Y., assignor, by mesne assignments, to E. I. du Pont de Nemours and Company, a corporation of Delaware No Drawing. Application September 5, 1931
Serial No. 561,501

11 Claims. (Cl. 23—250)

This invention relates to the stabilization of chlorinated hydrocarbons.

Compounds of this class, for example, trichlorethylene, tetrachlorethane or methylene chloride, tend to undergo decomposition during storage with the formation of substances of acid character. This decomposition makes the product objectionable for such purposes as extraction and produces an acidity that corrodes storage tanks. While this type of decomposition is more or less general in chlorinated hydrocarbons, it has been found that materials added to promote stability behave as inhibitory catalysts and as such may be very satisfactory for the stabilization of one or more compounds but are not necessarily satisfactory for all others.

Hydrocarbons, for instance gasoline, have been proposed as stabilizers for trichlorethylene. These are objectionable when the solvent is used in certain extraction processes because a comparatively large amount of gasoline is required to stabilize and the hydrocarbon "heavy ends" may be deposited in and contaminate the product of the extraction process.

Although some of the stabilizers heretofore proposed for chlorinated hydrocarbons are suitable for stabilizing trichlorethylene, tetrachlorethylene and chloroform, they have boiling points which are considerably at variance with the boiling points of these chlorohydrocarbon solvents. This difference in boiling points is a disadvantage because if the solvent is distilled, the stabilizer does not distill in the desired proportion with the solvent.

The object of this invention is to provide an effective stabilizer for trichlorethylene, tetrachlorethylene and chloroform which is effective in small concentrations and which does not develop an objectionable odor. A further object is to provide such a stabilizer which has a boiling point close to that of trichlorethylene.

I have discovered that triethylamine is suitable for stabilizing these chlorinated hydrocarbons and is especially suited for stabilizing trichlorethylene because its boiling point, 89° C., is within 3° C. of that of trichlorethylene. Its odor is relatively mild and it does not impart a color or odor when added to a chlorinated hydrocarbon in small amounts.

My process of stabilization comprises mixing a small amount, for instance 0.0001% to 0.1% by volume of triethylamine in the chlorinated hydrocarbon. If the chlorinated hydrocarbon is to be stored or handled with little or no exposure to light, I prefer to use about 0.0005% by volume of the stabilizer. Larger proportions of the stabilizer are required if the chlorinated hydrocarbon is to be kept stable in the presence of light.

The following examples show the results obtained by my invention.

Example 1

Seven portions of pure trichlorethylene were placed in transparent glass containers. To two portions 0.0005% by volume of triethylamine were added, to two other portions 0.001% by volume of triethylamine was added and the remaining portions were left without stabilizer. The containers were allowed to stand seven days at about 20–30° C. in diffused daylight. The trichlorethylene was then tested for decomposition by determination of acidity. In the results shown in the following table, the acidity is expressed in the number of ccs. of 0.01 normal alkali solution required to neutralize a 25 cc. sample.

Table I

| Sample | Stabilizer | Acidity |
|---|---|---|
| 1 | None | 65.0 |
| 2 | None | 95.0 |
| 3 | None | 125.0 |
| 4 | 0.0005% | 39.0 |
| 5 | 0.0005% | 30.0 |
| 6 | 0.001% | 0.2 |
| 7 | 0.001% | 1.5 |

Example 2

Seven samples of pure trichlorethylene were placed in opaque containers. To two samples were added 0.0005% by volume of triethylamine, to two others were added 0.001% by volume of triethylamine and the two remaining were left unstabilized.

After standing in a dark place at about 40° C. for 28 days, the three unstabilized samples required 102, 208, and 1180 ccs. respectively of 0.01 normal alkali solution to neutralize 25 cc. aliquots.

After the four samples containing triethylamine had stood in the dark at about 40° C. for 167 days, each required 0.1 cc. of 0.01 normal alkali solution to neutralize a 25 cc. aliquot.

Example 3

Four portions of pure chloroform were placed in clear glass containers. To two of these samples 0.05% by volume of triethylamine was added while the other two samples were left untreated. These samples were exposed to diffused sunlight and titrated at intervals of time with standard alkali or acid solution. The acidity, expressed in the number of cubic centimeters of 0.01 normal alkali solution required to neutralize 25 cc. aliquots was taken as a measure of decomposition.

| Sample | Amount of stabilizer | Acidity | |
|---|---|---|---|
| | | 5 days | 11 days |
| 1 | None | 46.8 cc | Over 50 cc. Bad odor. |
| 2 | None | 21.2 cc | Over 50 cc. Bad odor. |
| 3 | 0.05% | −4.6 cc | −2.1 cc. |
| 4 | 0.05% | −4.6 cc | −1.9 cc. |

The two stabilized samples (Nos. 1 and 2) remained clear, while those not stabilized (Nos. 3 and 4) became colored and precipitated out a brown deposit.

*Example 4*

Four portions of tetrachlorethylene were placed in clear glass bottles and 0.05% by volume of triethylamine was added to two of the samples. These samples were placed in diffused sunlight and titrated at intervals with standard alkali or acid solution. The following table shows the acidity, expressed as in Example 3, after the samples had been exposed to light for 11 days.

| Sample | Stabilizer | Acidity |
|---|---|---|
| 1 | None | 16 cc. |
| 2 | None | 17 cc. |
| 3 | 0.05% | −5 cc. |
| 4 | 0.05% | −4.5 cc. |

My invention is not limited to specific proportions of the stabilizer. The stabilizing action of triethylamine is markedly effective when a small amount, for instance 0.0005% is added to the chlorinated hydrocarbon. However, in practical usage larger amounts of the stabilizer, up to 0.01% or even more, may be necessary. The amount used will depend largely upon the conditions under which the chlorohydrocarbon is to be handled or stored.

I claim:

1. A composition of matter comprising a chlorinated hydrocarbon of the group comprising trichlorethylene, tetrachlorethylene and chloroform and stabilizing amounts of triethylamine.

2. A composition of matter comprising a chlorinated hydrocarbon of the group comprising trichlorethylene, tetrachlorethylene and chloroform and from about 0.0001% to about 0.1% by volume of triethylamine.

3. A composition of matter comprising trichlorethylene and stabilizing amounts of triethylamine.

4. A composition of matter comprising trichlorethylene and from about 0.0001% to about 0.1% by volume of triethylamine.

5. A composition of matter comprising trichlorethylene and about 0.0005% by volume of triethylamine.

6. A composition of matter comprising tetrachlorethylene and stabilizing amounts of triethylamine.

7. A composition of matter comprising tetrachlorethylene and from about 0.0001% to about 0.1% by volume of triethylamine.

8. A composition of matter comprising tetrachlorethylene and about 0.0005% by volume of triethylamine.

9. A composition of matter comprising chloroform and stabilizing amounts of triethylamine.

10. A composition of matter comprising chloroform and from about 0.0001% to about 0.1% by volume of triethylamine.

11. A composition of matter comprising chloroform and about 0.0005% by volume of triethylamine.

ARTHUR LORING PITMAN.